(12) United States Patent
Cui et al.

(10) Patent No.: US 8,249,679 B2
(45) Date of Patent: Aug. 21, 2012

(54) COVER LATCHING STRUCTURE FOR PORTABLE ELECTRONIC DEVICE

(75) Inventors: Yang-Yang Cui, Shenzhen (CN); Ming-Zhi Zheng, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 241 days.

(21) Appl. No.: 12/768,684

(22) Filed: Apr. 27, 2010

(65) Prior Publication Data

US 2011/0043086 A1 Feb. 24, 2011

(30) Foreign Application Priority Data

Aug. 21, 2009 (CN) .......................... 2009 1 0305890

(51) Int. Cl.
*H04M 1/00* (2006.01)
(52) U.S. Cl. ................................... 455/575.8
(58) Field of Classification Search ............... 312/223.4, 312/348.2, 223.1, 223.2; 411/549, 553; 429/97, 429/98; 455/566, 575.1, 575.8
See application file for complete search history.

(56) References Cited

U.S. PATENT DOCUMENTS

| | | | | |
|---|---|---|---|---|
| 2,373,722 A * | 4/1945 | Von Opel | ...................... | 411/349 |
| 2,385,180 A * | 9/1945 | Allen | ............................. | 411/551 |
| 3,171,182 A * | 3/1965 | Danehy | ......................... | 411/552 |
| 5,368,427 A * | 11/1994 | Pfaffinger | ..................... | 411/553 |
| 5,620,291 A * | 4/1997 | Hayes et al. | .................. | 411/552 |
| D448,763 S * | 10/2001 | Ikenaga | ....................... | D14/345 |
| 6,773,215 B2 * | 8/2004 | Cuva et al. | ..................... | 411/553 |
| 7,303,424 B2 * | 12/2007 | Tu et al. | ......................... | 439/372 |
| 7,369,882 B2 * | 5/2008 | Hwang et al. | .............. | 455/575.1 |
| 2002/0002059 A1 * | 1/2002 | Johnson | ........................ | 455/550 |
| 2005/0124392 A1 * | 6/2005 | Jeong | ......................... | 455/575.1 |
| 2006/0141344 A1 * | 6/2006 | Chen et al. | ....................... | 429/97 |
| 2007/0117598 A1 * | 5/2007 | Yang et al. | ................. | 455/575.1 |

* cited by examiner

*Primary Examiner* — James O Hansen
*Assistant Examiner* — Matthew Ing
(74) *Attorney, Agent, or Firm* — Altis Law Group, Inc.

(57) ABSTRACT

A cover structure for portable electronic device includes a rotating member, a cover, a retaining member and a main housing. The rotating member includes a head portion, a column and two wings projecting from the column. The cover defines a through hole allowing the column and the wings to extend through. The retaining member clasps the column to preventing the rotating member from getting away from the cover. The main housing defines a receiving hole. Two blocks and two slopes are formed in the receiving hole. The wings of the rotating member respectively rotate along the slopes to be locked by the blocks when the cover is attached to the main housing.

17 Claims, 5 Drawing Sheets

COVER LATCHING STRUCTURE FOR PORTABLE ELECTRONIC DEVICE

BACKGROUND

1. Technical Field

The present disclosure relates to portable electronic devices, particularly, to a cover latching structure used in a portable electronic device.

2. Description of Related Art

Detachable covers, such as battery covers, or camera covers, are widely used in portable electronic devices. A cover latching structure is applied to connect the cover to a housing of the portable electronic device. A conventional cover structure includes a plurality of hooks formed on the cover and a plurality of latching portions formed on the housing. The hooks are engaged with the latching portions to fix the cover to the housing. However, often strong forces are required to disengage the hooks from the latching portions, making the cover difficult to detach from the main housing.

Therefore, there is room for improvement within the art.

BRIEF DESCRIPTION OF THE DRAWINGS

Many aspects of the cover latching structure can be better understood with reference to the following drawings. The components in the drawings are not necessarily drawn to scale, the emphasis instead being placed upon clearly illustrating the principles of the cover latching structure, in which.

DETAILED DESCRIPTION

Figure 1:
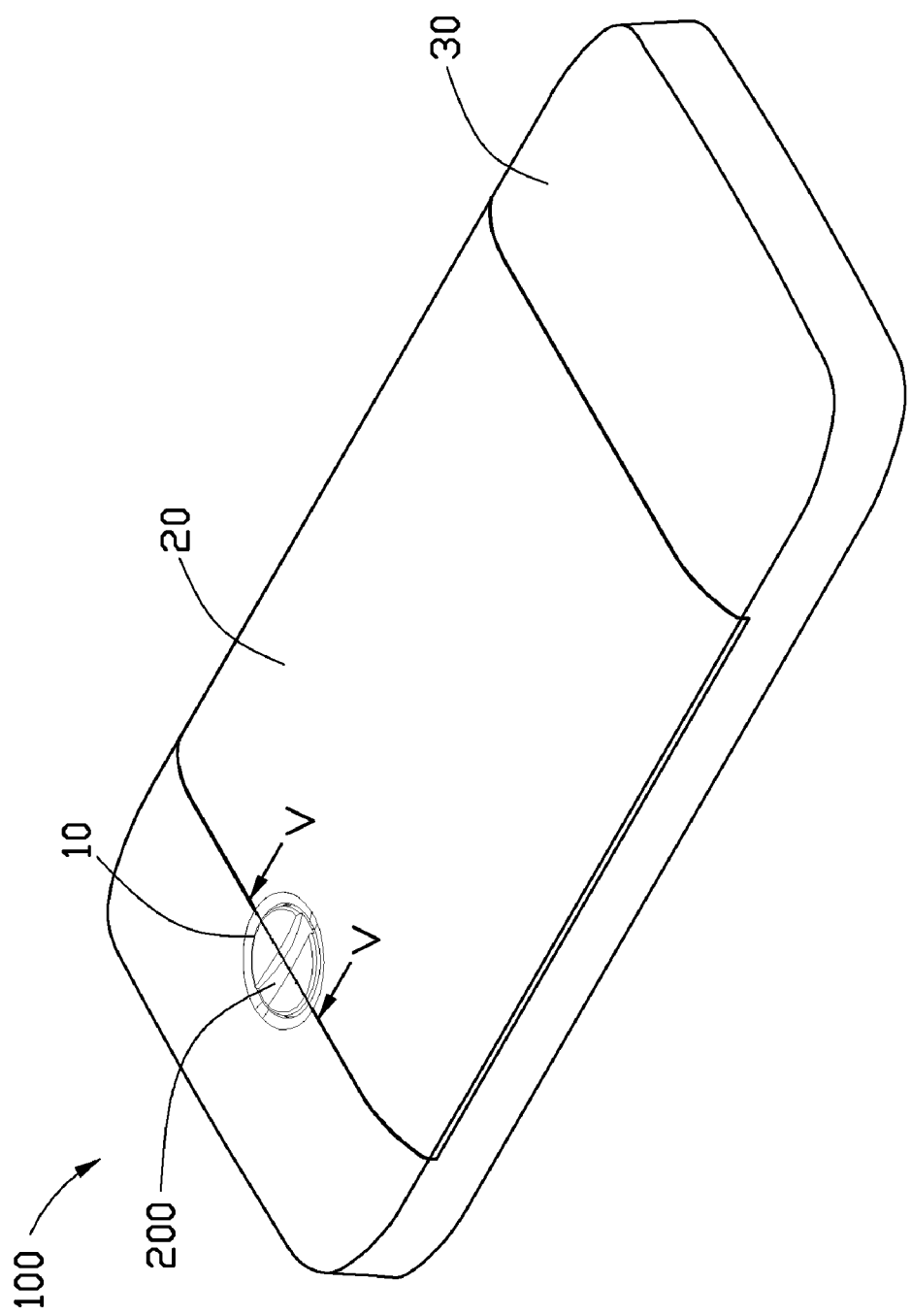
FIG. 1 is an assembled, isometric view of a portable electronic device with a cover structure, in accordance with an exemplary embodiment.
Figure 2:
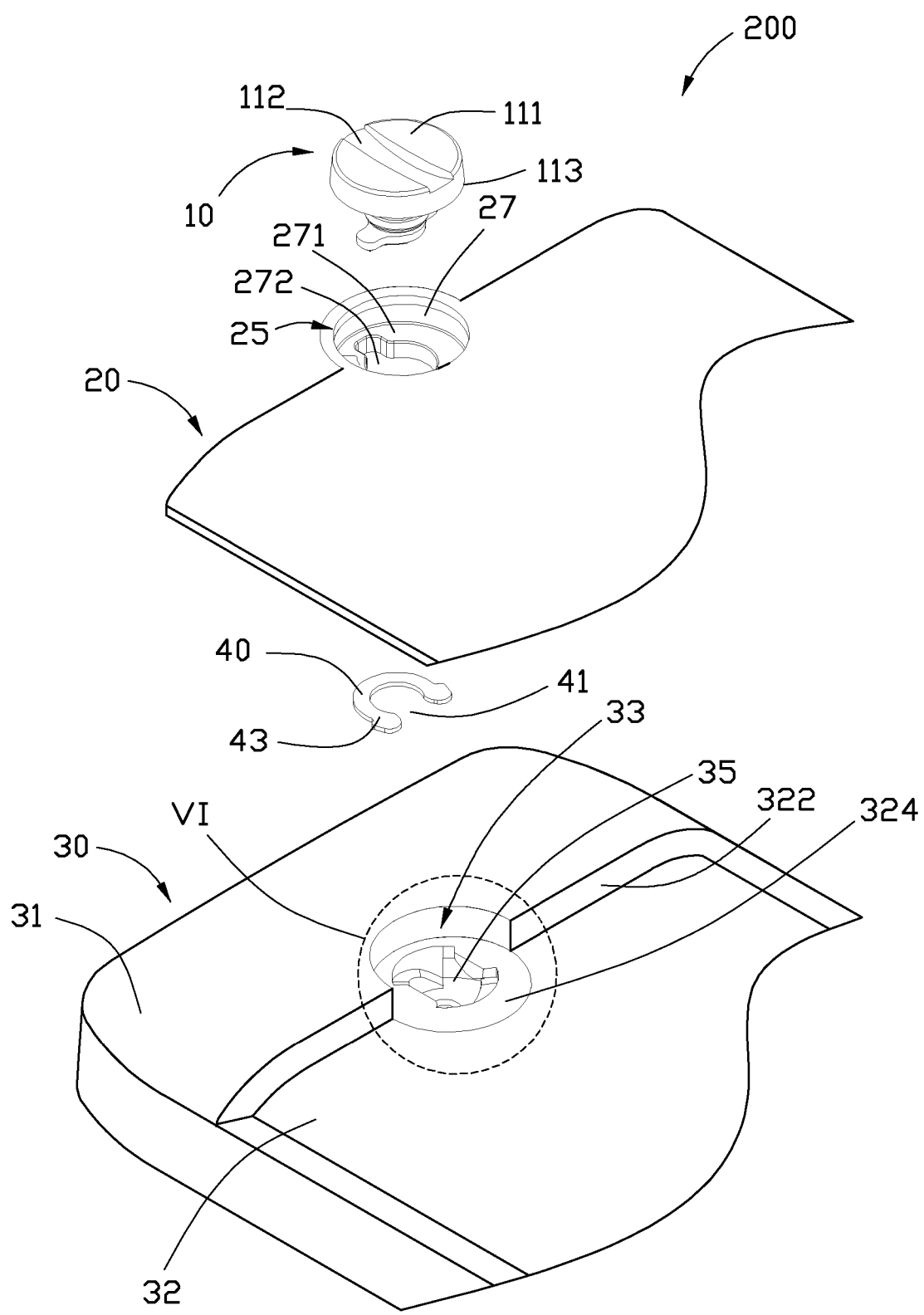
FIG. 2 is an exploded, isometric view of the cover structure shown in FIG. 1.

FIG. 1 shows an exemplary embodiment of a portable electronic device 100 with a cover latching structure 200. Referring to FIG. 2, the cover latching structure 200 includes a rotating member 10, a cover 20, a main housing 30 and a retaining member 40.

Figure 3:
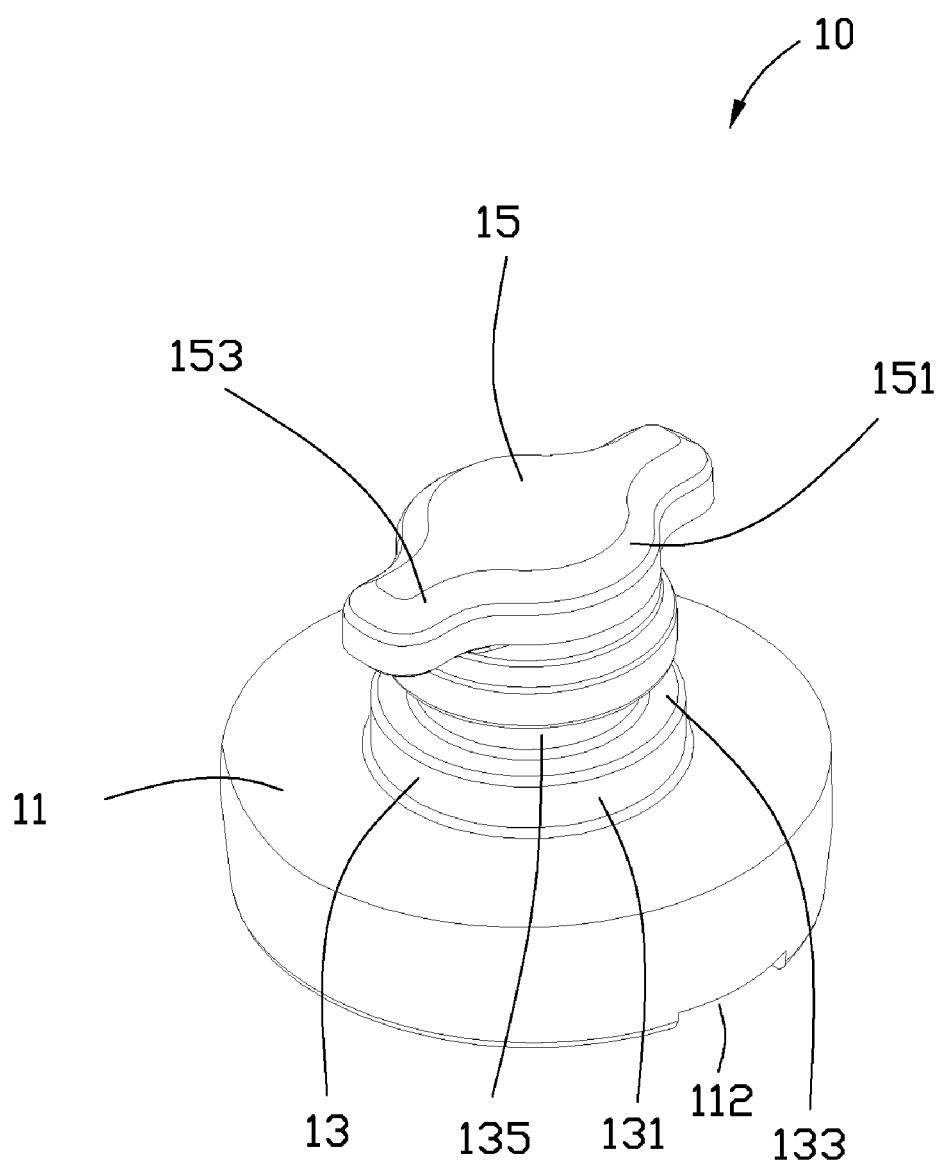
FIG. 3 is an enlarged view of a rotating member of the cover structure shown in FIG. 1.

Referring to FIG. 3, the rotating member 10 includes a head portion 11, a column 13, and a latching portion 15. The column 13 connects the head portion 11 to the latching portion 15. The head portion 11 defines a slot 112 at one side for easily rotating the rotating member 10 with a tool (e.g., screwdriver). The column 13 projects from the head portion 11 at the other side, and includes an outer circumferential surface 131. An annular groove 133 is defined in the outer circumferential surface 131 for receiving the retaining member 40, and a corresponding inner circumferential surface 135 is formed. The latching portion 15 includes a rounded chamfer 151 and a wing 153 projecting from each opposite direction of the rounded chamfer 151.

Referring back to FIG. 2, the cover 20 includes a holding portion 25 at one end. The holding portion 25 defines a circular cavity 27 for receiving the head portion 11 of the rotating member 10. The cavity 27 includes a bottom surface 271. A through hole 272 is defined in the bottom surface 271 corresponding to the latching portion 15 of the rotating member 10.

Figure 4:
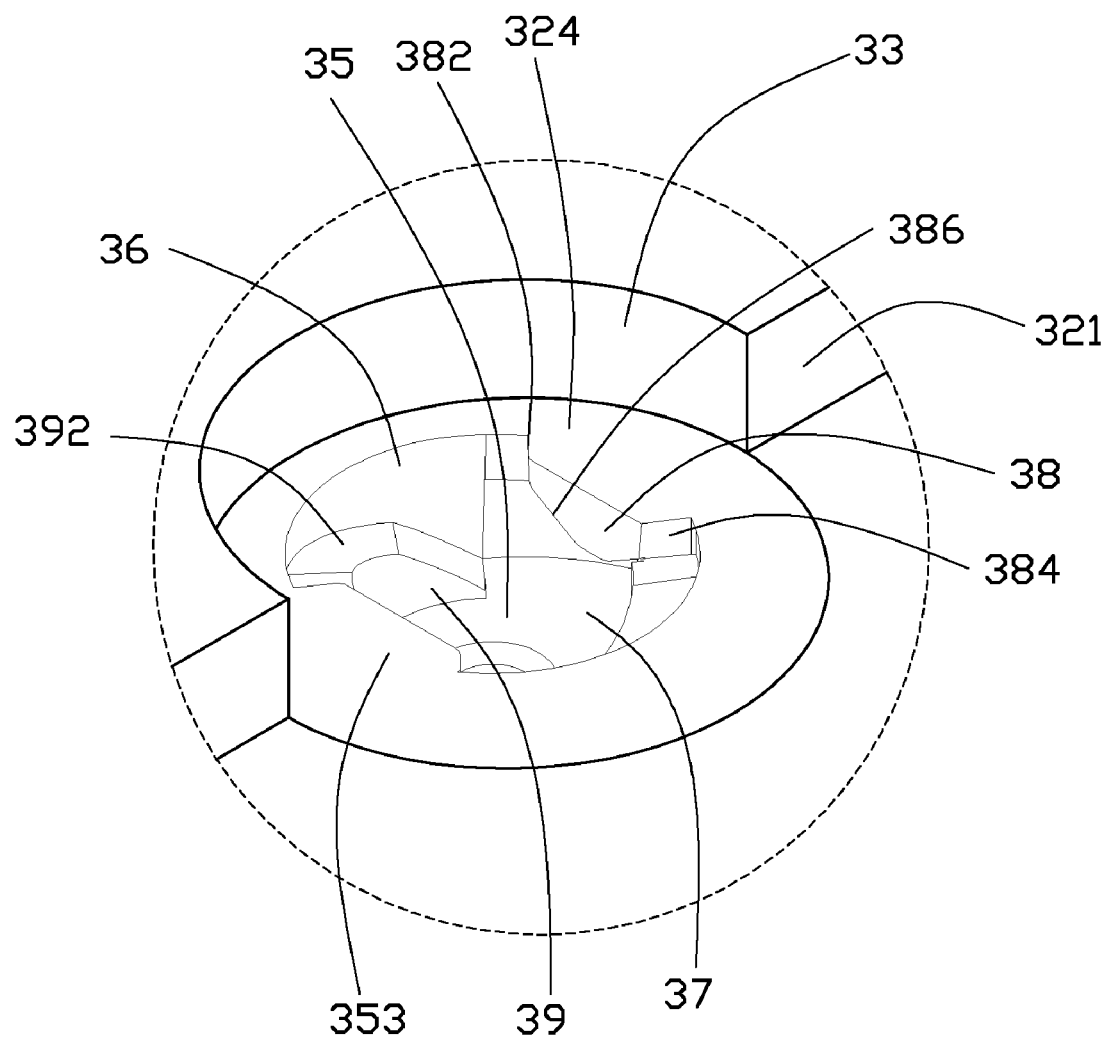
FIG. 4 is an enlarged view of a circled portion IV of FIG. 2.
Figure 5:
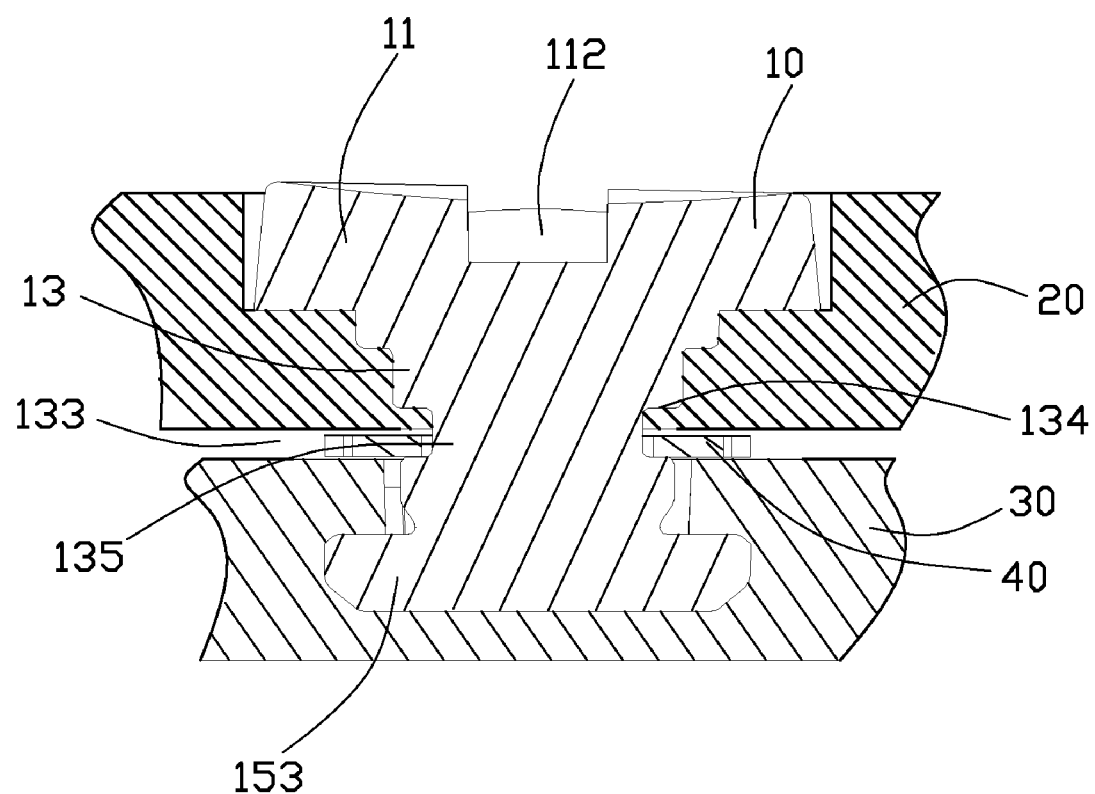
FIG. 5 is a cross section view of the assembled cover structure shown in FIG. 1.

The main housing 30 includes an upper surface 31, and the upper surface 31 is partially recessed to form a recessed portion 32 for receiving the cover 20. The recessed portion 32 includes an end wall 322 and a lower surface 324. The end wall 322 is partially recessed to define a semicircular notch for engaging with the holding portion 25 of the cover 20. Also referring to FIG. 4, a receiving hole 35 is defined in the lower surface 324 beneath the notch 33. A circumferential sidewall 36 and a bottom board 37 surround the receiving hole 35. Two blocks 38 protrude from the sidewall 36 facing each other. Each block 38 includes a sloping first end surface 382, a sloping second end surface 384 and a declining surface 386 for guiding the wings 153 of the rotating member 10 to rotate. Two protrusions 39 project from the bottom board 37 along the sidewall 36, connecting the blocks 38 correspondingly. Each protrusion 39 includes a slope 392. The slopes 392 respectively connect the second end surface 384 of the corresponding block 38 and the bottom board 37, for guiding the wings 153 of the rotating member 10 to rotate. Two protrusions 39 project from the bottom board 37 along the sidewall 36, connecting the blocks 38 correspondingly. Each protrusion 39 includes a slope 392. The slopes 392 respectively connect the second end surface 384 of the corresponding block 38 and the bottom board 37, for guiding the wings 153 of the rotating member 10 to rotate.

The retaining member 40, for example, a metal plate, is substantially C-shaped and defines an opening 41 forming two free ends 43. An inner diameter of retaining member 40 is similar in diameter to the inner circumferential surface 135 of the column 13, and the outer diameter of retaining member 40 is larger than the diameter of the outer circumferential surface 131 of the column 13. A distance between the two free ends 43 is smaller than a diameter of the inner circumferential surface 135 of the column 13.

To attach the cover 20 to the main housing 30, the rotating member 10 is inserted into the recessed portion 32. The latching portion 15 and the column 13 extend through the through hole 272, with the head portion 11 received in the recessed portion 32. The retaining member 40 is received in the annular groove 133 for preventing the rotating member 10 from separating from the cover 20. The cover 20 lies on the recessed portion 32 of the main housing 30, with the holding portion 25 engaged with the notch 33. The latching portion 15 of the rotating member 10 resists the lower surface 324 of the main housing 30. The rotating member 10 is pressed and rotated, so that the wings 153 are rotated down along the second end surfaces 384 and the slopes 392. The wings 153 then reach the bottom board 37 and move further until being respectively stopped by the protrusions 39. At this time, the wings 153 are entirely beneath the blocks 38 and locked by the blocks 38 correspondingly. Thus, the cover 20 is firmly attached to the main housing 30.

To detach the cover 20 from the main housing 30, the rotating member 10 is rotated backward, and the wings 153 rotate up along the slopes 362 and the second end surfaces 384. When the wings 153 reach the lower surface 332, the cover 20 can be moved away from the main housing 30.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cover structure for portable electronic device comprising:
   a rotating member including a head portion, a column and two wings projecting from the column;
   a cover defining a through hole allowing the column and the wings to extend through, the head portion of the rotating member resisting the cover at one side;
   a retaining member, the retaining member clasping the column at another side of the cover to preventing the rotating member from separating from the cover; and
   a main housing defining a receiving hole surrounded by a sidewall and a bottom board, two blocks and two slopes formed in the receiving hole, the two blocks protruding from the sidewall, two protrusions projecting from the bottom board along the sidewall, each block including a second end surface, each protrusion including a top surface, and the second end surface and the top surface constituting the corresponding slope, the wings of the rotating member rotating along the slopes to be locked by the blocks when the cover is firmly attached to the main housing.

2. The cover structure as claimed in claim 1, wherein the cover includes a holding portion, the holding portion defines a cavity for receiving the head portion of the rotating member, and the through hole communicates with the cavity.

3. The cover structure as claimed in claim 2, wherein the main housing includes a recessed portion for receiving the cover, the recessed portion includes a lower surface, and the receiving hole is defined in the lower surface.

4. The cover structure as claimed in claim 3, wherein the slopes connect the lower surface and the bottom board.

5. The cover structure as claimed in claim 4, wherein each of the blocks comprises a first end surface, the second end surface and a declining surface for guiding the corresponding wing to rotate, and the second end surface is one part of the corresponding slope.

6. The cover structure as claimed in claim 3, wherein the recessed portion further comprises an end wall, the end wall is recessed inside to form a notch engaging with the holding portion, and the receiving hole communicates the notch.

7. The cover structure as claimed in claim 1, wherein the rotating member further comprises a latching portion at one end of the column, the latching portion includes a rounding chamfer and the two wings, and the shape of the through hole corresponds with the latching portion.

8. The cover structure as claimed in claim 1, wherein the column defines an annular groove for receiving the retaining member.

9. The cover structure as claimed in claim 8, wherein the retaining member is substantially C-shaped, and an outer diameter of the retaining member is larger than an outer circumferential surface of the column.

10. A portable electronic device comprising:
    a cover defining a through hole;
    a rotating member rotatablely engaged in the through hole, the rotating member including two wings at one end, the wings extending through the through hole of the cover; and
    a main housing defining a receiving hole surrounded by a sidewall and a bottom board, two blocks and two slopes formed in the receiving hole, the two blocks protruding from the sidewall, two protrusions projecting from the bottom board along the sidewall, each block including a second end surface, each protrusion including a top surface, and the second end surface and the top surface constituting the corresponding slope, the wings of the rotating member rotating along the slopes to be locked by the blocks when the cover is firmly attached to the main housing.

11. The portable electronic device as claimed in claim 10, wherein the rotating member further comprises a head portion at another end, the cover includes a holding portion defining a cavity for receiving the head portion, and the through hole communicates with the cavity.

12. The portable electronic device as claimed in claim 11, wherein the main housing includes a recessed portion receiving the cover, the recessed portion includes a lower surface, and the receiving hole is defined in the lower surface.

13. The portable electronic device as claimed in claim 12, wherein the slopes connect the lower surface and the bottom board.

14. The portable electronic device as claimed in claim 13, wherein each of the blocks comprises a first end surface, the second end surface and a declining surface for guiding the corresponding wing to rotate, and the second end surface is one part of the corresponding slope.

15. The portable electronic device as claimed in claim 12, wherein the recessed portion further comprises an end wall, the end wall is recessed inside to form a notch engaging with the holding portion, and the receiving hole communicates the notch.

16. The portable electronic device as claimed in claim 10, further comprising a retaining member, wherein the rotating member further includes a column connecting the head portion and the wings, and the column defines an annular groove for receiving the retaining member.

17. The portable electronic device as claimed in claim 16, wherein the retaining member is substantially C-shaped, and an outer diameter of the retaining member is larger than an outer circumferential surface of the column.

* * * * *